United States Patent Office 3,677,903
Patented July 18, 1972

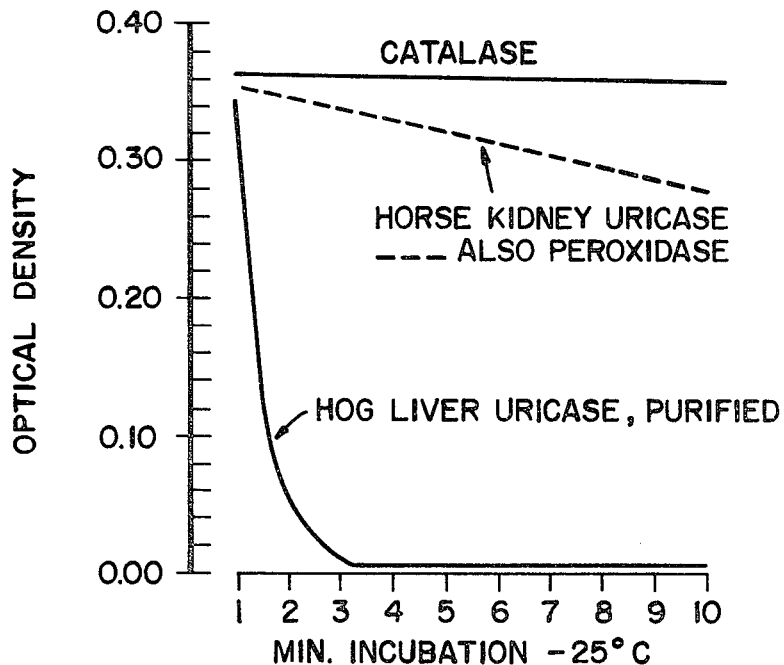
FIG_1
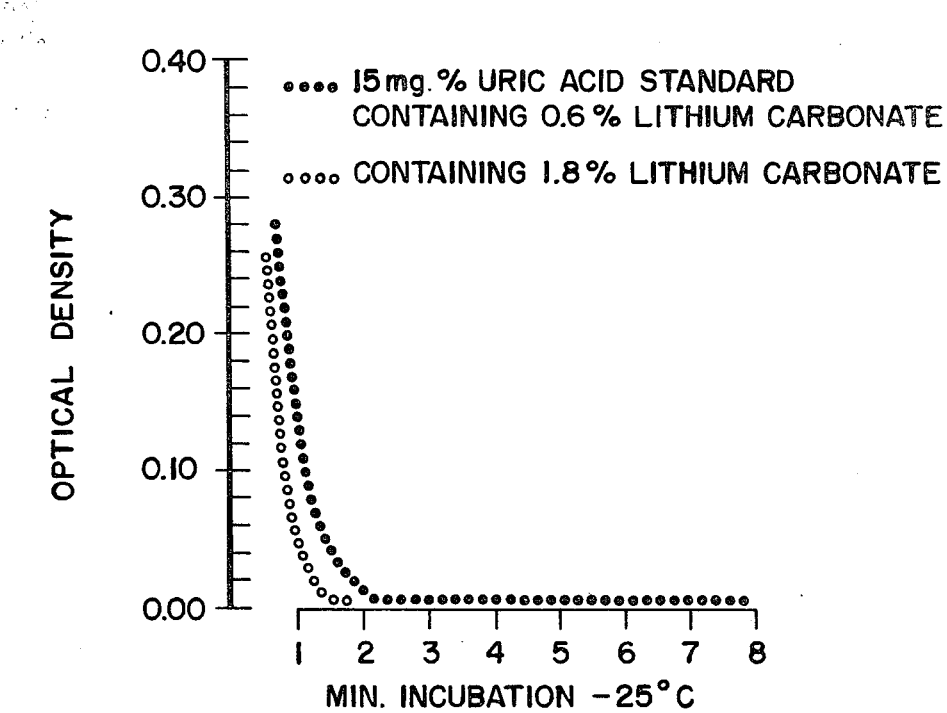
FIG_2

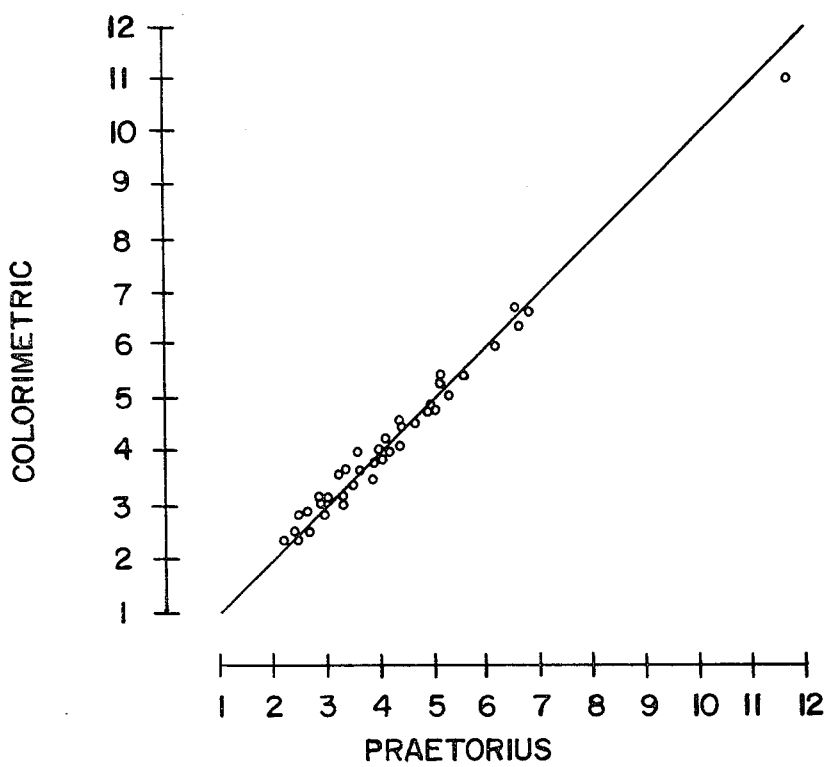
FIG_3

3,677,903
DETERMINATION OF URICASE ACTIVITY
Donald L. Bittner, P.O. Box 18007,
San Francisco, Calif. 94118
Filed May 19, 1969, Ser. No. 825,678
Int. Cl. G01n 31/14
U.S. Cl. 195—103.5 R          6 Claims

ABSTRACT OF THE DISCLOSURE

A method for determining the extent of oxidative activity of the enzyme uricase on human serum and other biological fluids, useful for analyzing the presence and amount of uric acid. Uricase is added to the serum or other fluid in quantities and in a buffer system suitable for digestion of substantially all uric acid present. At the same time, the enzyme catalase is added to destroy any hydrogen peroxide generated as a by-product in the urate oxidation by uricase. A color indicator sensitive to the presence and amount of oxidizing and reducing substances is added before and after the uricase digestion, and the colorimetric differential between the samples provides a measure of the uricase activity.

This invention relates to a new and improved method of chemical analysis for demonstrating the oxidative capacity of the enzyme uricase on human serum and other biological fluids, and, in particular, a method for determining the presence and amount of uric acid in such fluids.

Uricase is an enzyme not found in man and the anthropid apes, but which naturally occurs in lower mammals, specifically acting on uric acid to break it down to allantoin as the metabolic end product for excretion. Because of its specificity for uric acid, uricase was recognized as a valuable tool in uric acid analysis and was applied by Blauch and Koch, J. Biol. Chem. 139:443–454 (1939), to the long standing method of Folin and Denis, J. Biol. Chem. 13:469 (1912–13), for the determination of uric acid. The method of Folin and Denis and its many variations are direct photometric methods based upon the ability of uric acid in the presence of strong alkalies, to reduce phosphotungstate complexes to phosphotungstite complexes which are intensely blue in color. Blauch and Koch utilized differential photometry at approximately 420 m$\mu$ by adding phosphotungstic acid to the serum before and after a uricase digestion in order to increase the specificity of the results. In either method, however, the use of phosphotungstate complexes was found to produce variable and unsatisfactory results because of the non-specificity of phosphotungstate reduction, low recovery of uric acid from tungstic acid filtrates in the method of Folin and Wu, J. Biol. Chem. 38:81 (1919), frequent turbidity, and the use of highly poisonous cyanide to improve sensitivity. In particular, the chromogenic response of phosphotungstic acid reagent is non-linear, not following Beer's law, and is subject to the interference of many other substances.

As an alternative to the above colorimetric methods of uric acid determination, Kalckar, J. Biol. Chem. 167:429 (1947) and Praetorius, Scan. J. Clin & Lab. Invest. 1:222 (1949) introduced differential ultraviolet spectrophotometry techniques to measure changes in the characteristic absorption range for uric acid, 290–293 m$\mu$, resulting from the action of uricase on serum and other fluids. Ultraviolet spectrophotometry in the characteristic wavelengths of uric acid avoids the errors introduced when chromogenic reduction methods are applied before and after uricase digestion in order to develop color in the visible ranges. However, because the instrumentation for differential ultraviolet spectrophotometry is extremely elaborate and expensive, it is impractical for routine use in the clinical laboratory and interest has continued for the development of a reliable and accurate colorimetric method of uric acid determination.

In U.S. Pat. No. 3,282,649, entitled "Determination of Oxidizing and Reducing Substances," Bittner describes a new method for determining the presence and amount of oxidizing and reducing substances in solution, based upon the detection of a color change in certain copper-phenanthroline or copper-biquinoline chelate indicators caused by a valance change in the copper initiated by the oxidizing or reducing substances. The particular chelate used is preformed so that all of the copper is substantially completely bound by the chelating agent when it is used in a soltuion containing the material to be analyzed. Suitable conditions are employed to cause the oxidizing or reducing substance in solution to change the valence state of the bound copper. The indicators are formed by complexing copper with a chelating agent such as cuproine (2,2'-biquinoline), neocuproine (2,9-dimethyl-1,10-phenanthroline), bathocuproine (2,9-dimethyl-4,7-diphenyl-1-10-phenanthroline), water soluble salts thereof such as hydrochloride and hydrosulfate salts and various substituted forms. These indicators are characterized by a pronounced color change when the bound copper undergoes a change in valence state, and the colors are extremely stable and are in consonance with Beer's law so that conventional colorimetric techniques can be used. The indicators have been used to analyze the presence and amount of a variety of substances including uric acid, according to the method of contacting the appropriately prepared serum or other biological fluid with the indicator in a solution and under conditions for reduction of copper by the material to be analyzed, and colorimetrically measuring the amount of copper that is reduced to the cuprous state by reference to the light transmittance of the solution. Uric acid in solution, maintained at a slightly acid to near neutral pH and in the presence of a non-reactive buffer such as acetate buffer, selectively reduces the indicators to the exclusion of action by creatinine and glucose, for example, providing selective reduction and accurate and stable colorimetric results. Because of their excellent stability and specificity under proper conditions, these indicators have proved successful in providing accurate and reliable analyses by colorimetric methods routinely used in the clinical laboratory and in automated analyzing instruments such as the SMA-12, of Technicon Instruments, Inc., Ardsley, N.J.

In an attempt to find an improved colorimetric method for determining the activity of uricase, Morgenstern et al., Clin. Chem. 12:748–766 (1966), have applied the copper chelate indicators described by Bittner to serum and other biological fluids before and after digestion by uricase. According to the method of Morgenstern, et al., one of a plurality of samples containing uric acid in solution is reacted in a buffered uricase solution using, for example, a glycine buffer at pH 9.0. A neocuproine copper chelate indicator is added to the digested sample and an undigested sample and the transmittance of each measured in colorimeter. A discrepancy appears in the results of this method, however, in the form of residual absorbance in the digested sample indicating incomplete oxidation by the uricase or interference by some substance other than uric acid in color development yielding inaccurate results. Morgenstern et al. attributed the residual absorbance to lithium carbonate inhibition of the uricase reaction, the standard uric acid samples used by them having been in lithium carbonate solutions.

According to the present invention, however, it has been found that the unsatisfactory results produced by Morgenstern et al. are due primarily not to lithium carbonate inhibition, but rather to the interference of another substance generated as a by-product during the uricase oxidation, in particular, hydrogen peroxide ($H_2O_2$). In the method of the present invention, the interference of $H_2O_2$ in the otherwise accurate color development and stability of copper chelate indicators and other color indicators is eliminated by destroying $H_2O_2$ generated by the uricase digestion. In a preferred embodiment of the present method, serum or other biological fluid is oxidized by purified uricase in a borate buffer maintained at approximately pH 9.2 and in the presence of the enzyme catalase which specifically breaks down hydrogen peroxide into water and molecular oxygen without interfering in the uricase digestion or subsequent color development. An indicator such as, for example, copper-phenanthroline is added to samples before and after the uricase oxidation for differential colorimetric measurement according to the well known laboratory methods.

It is therefore an object of the present invention to provide a highly specific and accurate method for determining the activity of uricase on human serum and other biological fluids and, in particular, a method for determining the presence and amount of uric acid in such fluids.

Another object of the invention is to provide a specific and accurate method for colorimetrically determining the activity of uricase and the presence and amount of uric acid according to procedures suitable for routine use in the clinical laboratory.

A further object is to provide a colorimetric determination for uricase activity in which the interference by intermediates or end products of the uricase oxidation with the color indicator is eliminated.

Other aspects and features of the invention are hereinafter discussed in which reference is made to the following drawings.

FIG. 1 is a graph of the activity of the enzymes catalase, crude uricase, peroxidase, and purified uricase on an aqueous uric acid standard solution.

FIG. 2 is a graph of the effect of lithium carbonate on uricase activity as measured colorimetrically by a copper chelate indicator.

FIG. 3 is a graph of the linear correlation between the colorimetric method of the present invention and the ultraviolet spectrophotometric method of Praetorius.

In living systems uricase catalyzes the decomposition of uric acid into allantoin, hydrogen peroxide and carbon dioxide. It is known, however, that the end products of uricase digestion vary depending upon the buffer and pH of the liquid phase environment in which it takes place. For example, in a borate buffer with an alkaline pH in the neighborhood of 7.2 to 9.2 the end products are hydrogen peroxide, urea, and allaxonic acid. Various combinations of the above-mentioned end products may be produced under different conditions. See Canellakis & Cohn, J. Biol. Chem., 213:385–395 (1955). In any case, however, hydrogen peroxide appears as an end product. For example, a urate oxidation by uricase in a borate buffer having pH 9.2 produces the following reaction:

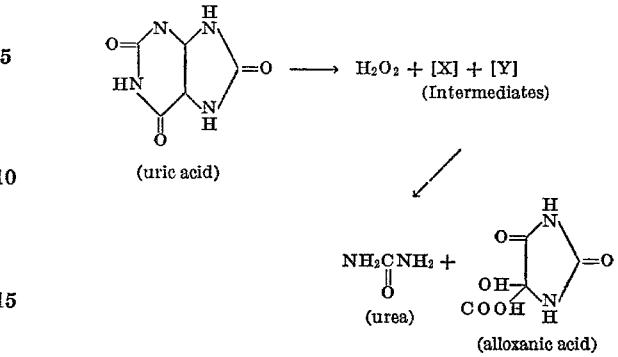

According to the present invention, it has been found that the hydrogen peroxide generated as either an intermediate or end product during the digestion of uric acid by uricase interferes in subsequent color development of indicators colorimetrically responsive to the presence and amount of reducing substances remaining in the biological fluid. In practicing the present invention, the urate oxidation by uricase is conducted in the presence of the enzyme catalase which selectively decomposes hydrogen peroxide generated either as an intermediate or end product during the reaction. The uricase digestion is carried out in an alkaline medium, preferably in the range of pH 7–10 and in any of a variety of solvent systems, preferably a buffer solution such as an aqueous borate buffer.

As shown in FIG. 1, the activity of the enzyme catalase is specific to hydrogen peroxide and does not otherwise alter the presence and amount of oxidizing and reducing substances present in animal biologic fluid samples as determined colorimetrically.

Catalase in low concentration is a substantially colorless iron-containing enzyme which catalyzes the decomposition of hydrogen peroxide to water and molecular oxygen according to the following generally accepted formula in which the ferric and ferrous iron indicated represent the active site of a catalase enzyme molecule:

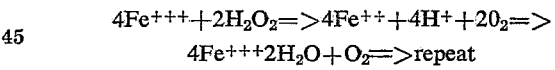

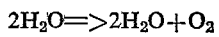

The net result is as follows:

$$2H_2O \Longrightarrow 2H_2O + O_2$$

Furthermore, catalase does not interfere with the color indicator. On the other hand, peroxidase would be unsuitable as an enzyme for breaking down hydrogen peroxide generated during urate oxidation by uricase because it is non-specific and acts on other substances present in the fluid, such as, for example, uric acid. FIG. 1 also shows the difference in oxidative activity of crude horse kidney uricase indicated by the dotted line, and purified hog liver uricase indicated by the solid curved line, as determined colorimetrically using indicators responsive to the presence and amount of reducing substance. Thus, utilizing purified hog liver uricase, the incubation time for substantially complete digestion of all uric acid present in the sample serum is approximately three minutes.

In the method of Praetorius for the determination of uric acid, crude uricase was added to one of two samples of serum containing uric acid. After a prolonged period of incubation, the activity of the uricase in the first sample was measured by reference to the ultraviolet absorption of the two samples at 290–295 m$\mu$., the characteristic absorption spectrum for uric acid. The different spectrophotometric absorption between the two samples provided a measure of the change in uric acid present and hence a measure of the activity of the uricase placed in the first sample. The method of Praetorius in its modern form has generally been considered the most accurate and specific for the determination of uric acid.

The present invention provides a colorimetric method for the determination of the activity of uricase without resort to elaborate ultraviolet spectrophotometry equipment. The present invention generally contemplates the method of preparing first and second samples of a pre-determined quantity of biological fluid in a solution, adding uricase to the first sample in the presence of catalase and incubating the first sample, contacting the first and second samples in liquid phase with an indicator colorimetrically responsive to reducing constituents of the biological fluid, and thereafter measuring the oxidative activity of uricase on the substances in the biological fluid by reference to the difference in light transmittance between the first and second samples. By this method, the difficulties encountered by Morgenstern et al. are eliminated, and an accurate and specific method for colorimetrically determining the oxidative activity of uricase is provided. Morgenstern et al. attributed the discrepancies in their results to the attenuation of uricase activity by the presence of lithium carbonate. As illustrated in FIG. 2, however, an increase in the presence of lithium carbonate in a uric acid standard during urate oxidation by uricase results in, if anything, a slight reduction in the required incubation period. According to the present invention it has been determined that the residual absorption of the blank samples in the method of Morgenstern is attributable to the action of hydrogen peroxide on the indicator subsequently added. In the method of the present invention, sufficient catalase is added during the uricase reaction to decompose substantially all $H_2O_2$ generated by the reaction.

The highly specific and accurate results achieved by the method of the present invention is illustrated in FIG. 3 in which the linear correlation between the results obtained by the method of the present invention and the method of Praetorius is presented. These results were achieved by procedures of which the following are set forth by way of example.

EXAMPLE 1

An aqueous borate buffer solution at pH 9.2, concentration 0.05 M, was prepared and 6.0 ml. of the buffer solution placed in each of two test tubes. In one of the test tubes serving as the container for the blank sample, a .020 ml. mixture of uricase and catalase was added. The uricase-catalase mixture was prepared by first mixing in the ratio of 1:1 uricase (Boeringer-Manheim) and Katalase (Boeringer-Manheim) and then diluting the uricase-catalase mixture with water in the ratio of 1:5 Human blood serum in the amount of .200 ml. was added to each of the test tubes and the samples were incubated at 25° C. for five minutes. 1.0 ml. of working indicator solution was thereafter added to each sample and the oxidative activity of uricase in the blank sample determined by reference to the difference in light transmittance between the first and second samples. The working indicator solution was formed by addition of .2 gram hydrated $CuSO_4$, .4 gram Neocuproine hydro-chloride, and a drop of 1 N HCl in sufficient water to produce a total volume of 100 ml. The hydrated copper sulphate is formed of five waters per molecule. The 100 ml. mixture is diluted in water in the ratio of 1:10 to provide the working indicator solution, 1 ml. of which is added to each of the test tubes to develop color according to the presence of reducing substances.

EXAMPLE 2

Each of two test tubes is provided with 6 ml. of 0.05 M aqueous borate buffer at pH 9.2 as in the previous example. In the first test tube, to contain the blank sample, .020 ml. of the previous uricase-catalase mixture is added. .050 ml. of urine is added to each of the test tubes and incubated for three minutes at 25° C. 1.4 ml. of the working indicator solution described above was added to each of the samples with the colorimetric determination thereafter carried out as heretofore described.

In the examples described above, catalase was added to the first sample only, the sample to which uricase was added. The catalase can be "blanked," however, by adding it to both samples so that any color effect from the catalase is eliminated in the final result.

A feature of the embodiments of the present invention set forth above is that the pH of the sample need not be adjusted before addition of the particular working indicator solution. Other indicator solutions and other types of indicators colorimetrically responsive to the presence of reducing substances in the sample can also be used with appropriate adjustment of the pH as required for the particular indicator. Adjustment of the pH may be accomplished by means of, for example, acetic acid. In any case, interference by $H_2O_2$ with the indicator selected is eliminated by means of the present invention.

Another feature of the present invention is that the same samples with the same reagents can be used in either the method of Praetorius or the method of the present invention or both in order to provide a verification of the results.

I claim:

1. In a method for colorimetrically determining uric acid in a biological fluid, including preparing first and second samples of a pre-determined quantity of the biological fluid in a solvent system, adding uricase to the first sample and incubating, adding a copper containing indicator colorimetrically responsive to reducing substances in the fluid to the first and second samples, and thereafter measuring the uric acid in the first sample by reference to the difference in light transmittance between the first and second samples, the improvement comprising: adding sufficient catalase with the uricase to the first sample, whereby hydrogen peroxide generated during the digestion by uricase is decomposed by the catalase, with the proviso that said catalase and said uricase are provided from independent sources.

2. A method according to claim 1, wherein said indicator consists essentially of a pre-formed chelate of copper with a member of the group selected from 2,2'-biquinoline and 2,9-substituted-1,10-phenanthrolines.

3. A method for the colorimetric determination of the activity of uricase as set forth in claim 1 wherein said indicator consists essentially of a preformed chelate of substantially completely bound copper with a member of the group selected from 2,2'-biquinolines and 2,9-substituted-1,10-phenanthrolines.

4. A method as set forth in claim 1 wherein said solvent is an aqueous borate buffer solution.

5. A method for colorimetrically determining the activity of uricase as set forth in claim 1 wherein said solvent system consists of an aqueous borate buffer solution having an alkaline pH.

6. A method as set forth in claim 1 wherein said solvent system is formed with a pH approximately 7–10.

References Cited

UNITED STATES PATENTS 3,349,006   10/1967   Albaum _____ 195—103.5

OTHER REFERENCES

"Chemical Abstracts," 52:9241i (1958).
"Chemical Abstracts," 59:2368f (1963).
"Chemical Abstracts," 59:1360d (1964).
Canellakis et al.: "J. Biol. Chem." 213:385–6+ (1955).
Horecker et al.: "J. Biol. Chem." 178:683+ (1949).

LIONEL M. SHAPIRO, Primary Examiner

M. D. HENSLEY, Assistant Examiner